(No Model.)

J. C. CLIFFORD.
NUT LOCK.

No. 431,252. Patented July 1, 1890.

WITNESSES:
P. H. Nagle
L. Douville

INVENTOR
Joseph C. Clifford
BY
John A. Sidenberg
ATTORNEY.

UNITED STATES PATENT OFFICE.

JOSEPH C. CLIFFORD, OF THE UNITED STATES ARMY.

NUT-LOCK.

SPECIFICATION forming part of Letters Patent No. 431,252, dated July 1, 1890.

Application filed November 20, 1885. Serial No. 183,433. (No model.)

*To all whom it may concern:*

Be it known that I, JOSEPH C. CLIFFORD, an officer of the Ordnance Department, United States Army, and at present a resident of the city of Philadelphia, have invented certain new and useful Improvements in Screws and Nuts, of which the following is a specification.

The object of my invention is to furnish a ready and efficient means of securing, in any desired position, nuts to bolts, tie-rods, axles, parts of locomotives, and railway-cars, parts of bridges, parts of various machines, and parts of gun-carriages, in such a manner that the nuts may not become loosened by jarring or by any turning of the bolts or other parts to which they are attached.

Figure 1:
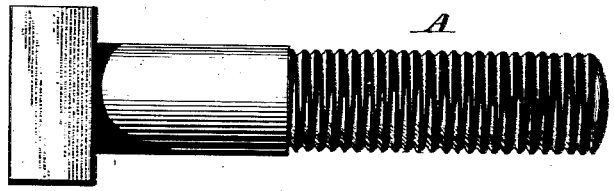
Figure 2:
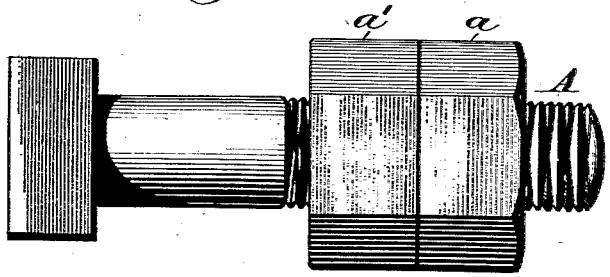
Figures 3, 4:
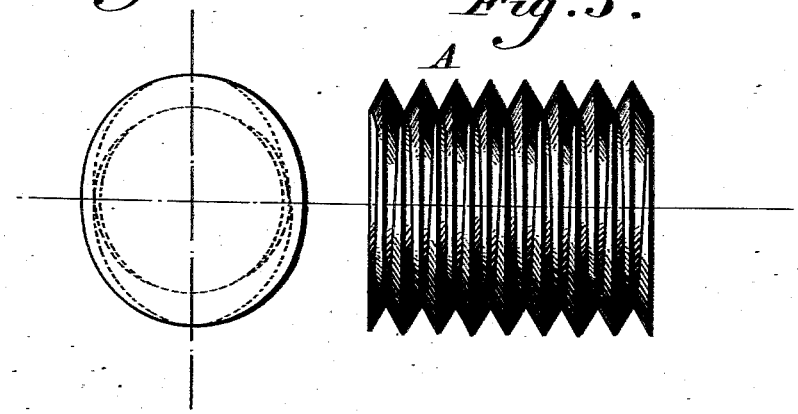

Figure 1 represents a side elevation of a bolt or screw embodying my invention. Fig. 2 represents a similar view of a bolt or screw with nuts thereon. Fig. 3 represents a side elevation of a portion on an enlarged scale. Fig. 4 represents an end view of the part shown in Fig. 3.

Similar letters of reference indicate corresponding parts in the several figures.

The duplex screw A is a screw chased with two threads, one right-hand and the other left-hand, intersecting each other, as shown in projection in Figs. 1 and 3 of the accompanying drawings. Any convenient form of thread may be used, and it is not necessary that the two threads should be of the same pitch. The said screw is elliptical in cross-section, as is clearly shown in the drawings.

The locking-nut is a nut in two parts $a$ $a'$, as shown in projection in Fig. 2 of the accompanying drawings. These two parts, when separate, are ordinary nuts, one tapped with a right-hand thread and the other with a left-hand thread. The inner portion $a'$ has a bore larger in diameter than the outer portion $a$, so as to be more loosely fitted on the screw A than the said part $a$. When together upon the duplex screw, these parts form a couple which cannot move thereon in either direction so long as contact is maintained.

I claim as my invention—

1. A nut-lock consisting of a double-threaded screw, the grooves of which intersect, leaving reduced threads near lines of intersection, the screws being elliptical in cross-section, and two nuts, one of which is right-threaded and the other left-threaded, substantially as described.

2. A nut-lock consisting of a double-threaded screw elliptical in cross-section, and a right and a left threaded nut, the inner of which is larger in its bore than the outer nut, substantially as and for the purpose set forth.

J. C. CLIFFORD.

Witnesses:
IRA MACNUTT,
F. ED. NEUKOM.